May 7, 1968 H. C. SIBLEY 3,382,484

CENTRAL TO REMOTE COMMUNICATION SYSTEM HAVING INTERROGATION PULSE POWERED STEPPER AT THE REMOTE STATION

Filed July 16, 1964 4 Sheets-Sheet 1

INVENTOR.
H.C.SIBLEY

BY Forest B. Hitchcock

HIS ATTORNEY

INVENTOR.
H.C.SIBLEY
BY Forest B. Hitchcock
HIS ATTORNEY

INVENTOR.
H. C. SIBLEY
BY
Forest B. Hitchcock
HIS ATTORNEY

INVENTOR.
H.C.SIBLEY
BY
Forest B. Hitchcock
HIS ATTORNEY 3,382,484

CENTRAL TO REMOTE COMMUNICATION SYSTEM HAVING INTERROGATION PULSE POWERED STEPPER AT THE REMOTE STATION

Henry C. Sibley, Spencerport, N.Y., assignor to General Signal Corporation, Rochester, N.Y., a corporation of New York Filed July 16, 1964, Ser. No. 383,073
11 Claims. (Cl. 340—163)

ABSTRACT OF THE DISCLOSURE

A code communication system for registering indications at a control office of the conditions of apparatus at multiple remote stations wherein the remote stations are powered solely by the energy of pulses received over a line circuit from the control office. Each remote station transmits a distinctive frequency, and where several indications are to be transmitted from one station, a stepper is provided at that station, the stepper being powered solely by the energy pulses transmitted over the line circuit, one pulse for each step.

Figure 1:
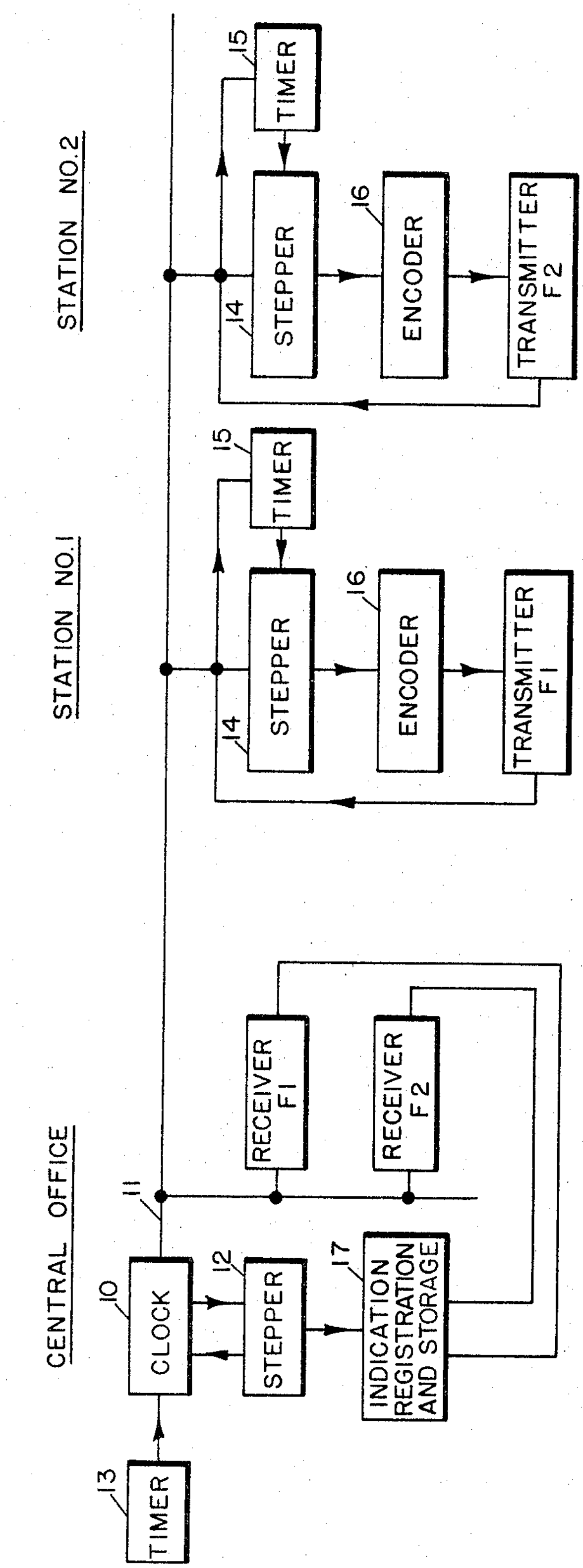

This invention relates to code communication systems for supervisory control and/or indication applications, and it more particularly pertains to a multiple station system for the communication of indications of conditions of a plurality of binary devices over a communication channel from each of a plurality of remote stations to a central office.

It is often desirable to transmit indications of conditions of devices at remote locations or stations to a central office where there is no power supply at such stations. One such system is disclosed in the prior Haner and Sibley Patent No. 3,021,506, granted Feb. 13, 1962. In the system according to that patent, the conditions of two binary devices can be transmitted from a remote station over a communication channel to a central office at one carrier frequency, one device being indicated in response to a positive interrogation pulse transmitted from the control office and the other device being indicated in response to a negative interrogation pulse transmitted from the control office. The carrier transmitter at the remote station is both driven and powered by pulses received over the communication channel from the central office. For each additional pair of devices to be indicated in this system, an additional field transmitter is required at a different frequency, and also a receiver for such frequency is required at the central office.

The present invention greatly increases the capacity of the system according to the above prior patent, with better economy, by an organization that is still powered entirely over the communication channel from the central office, which requires only one carrier transmitter at each field location, irrespective of the number of binary devices at that location to have their conditions indicated at the central office.

This improved mode of operation is provided by operating a stepper at each station solely by drive pulses received over the communication channel from the central office and by selectively rendering a carrier transmitter effective to transmit during the respective steps in accordance with the conditions of respective binary devices, one device being selected by each step. The stepping is accomplished by the transmission successively of a series of drive pulses of alternate polarities from the central office, the different series of pulses being separated by distinct synchronization pulses.

At the central office, receivers are provided for different frequencies respectively corresponding to the carrier frequencies transmitted at the several stations and a single stepper is driven substantially in synchronism with the station steppers because it is driven by the drive pulse transmitting apparatus. The stepper switches the outputs of the different frequency receivers simultaneously to proper indication registration devices corresponding to the binary devices at the stations that are having their indications transmitted during the respective steps. This system reduces to a minimum the number of carrier transmitters and receivers required in accordance with a reduction in the number of distinctive frequencies required, a carrier transmitter and receiver being saved for each two steps as compared to the system according to the prior Patent No. 3,021,506.

An object of the present invention is to communicate indications of the conditions of several binary devices from a remote station to a central office wherein the devices are scanned by steppers at the station that are powered solely by drive pulses transmitted over a communication channel from a central office.

Another object of the present invention is to repeatedly communicate indications over a communication channel to a central office in a system wherein transmitters and steppers at the several stations are driven and powered solely by drive pulses transmitted from a central office over a communication channel.

Another object of the present invention is to provide a code communication system of the character described that automatically resets itself in case of a power interruption.

Other objects, purposes and characteristic features of the present invention will be in part obvious from the accompanying drawings and in part pointed out as the description of the invention progresses.

Figure 2A:
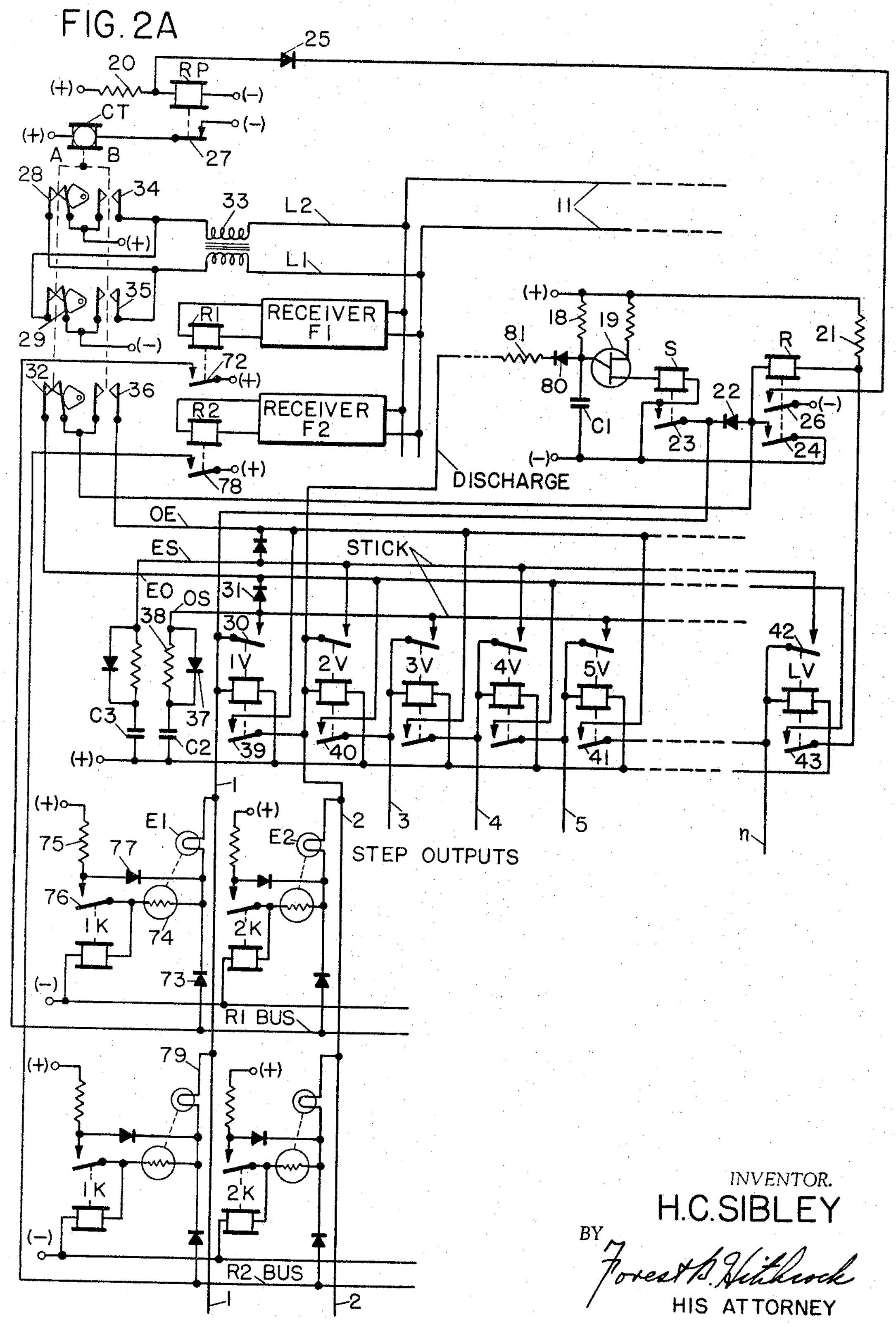
Figure 2B:
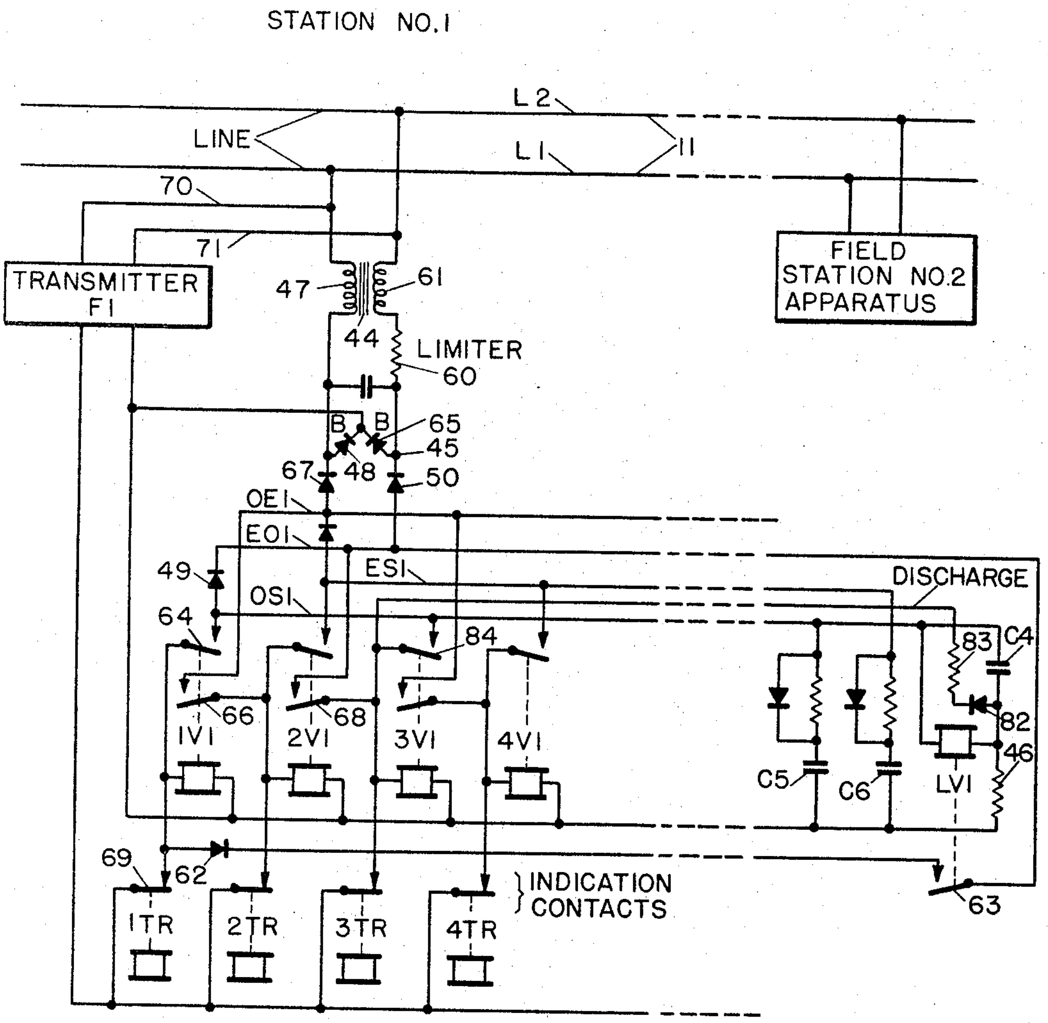
Figure 4:
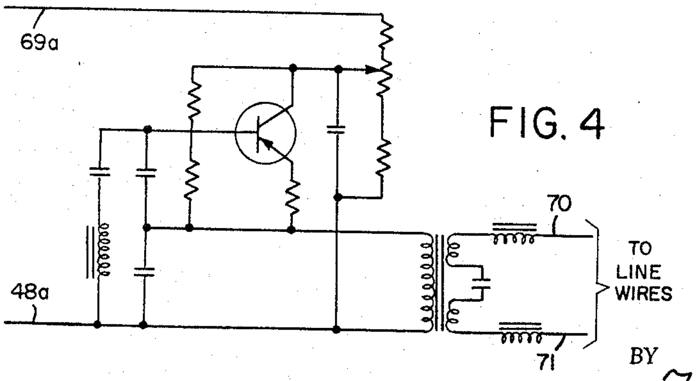
Figure 3:
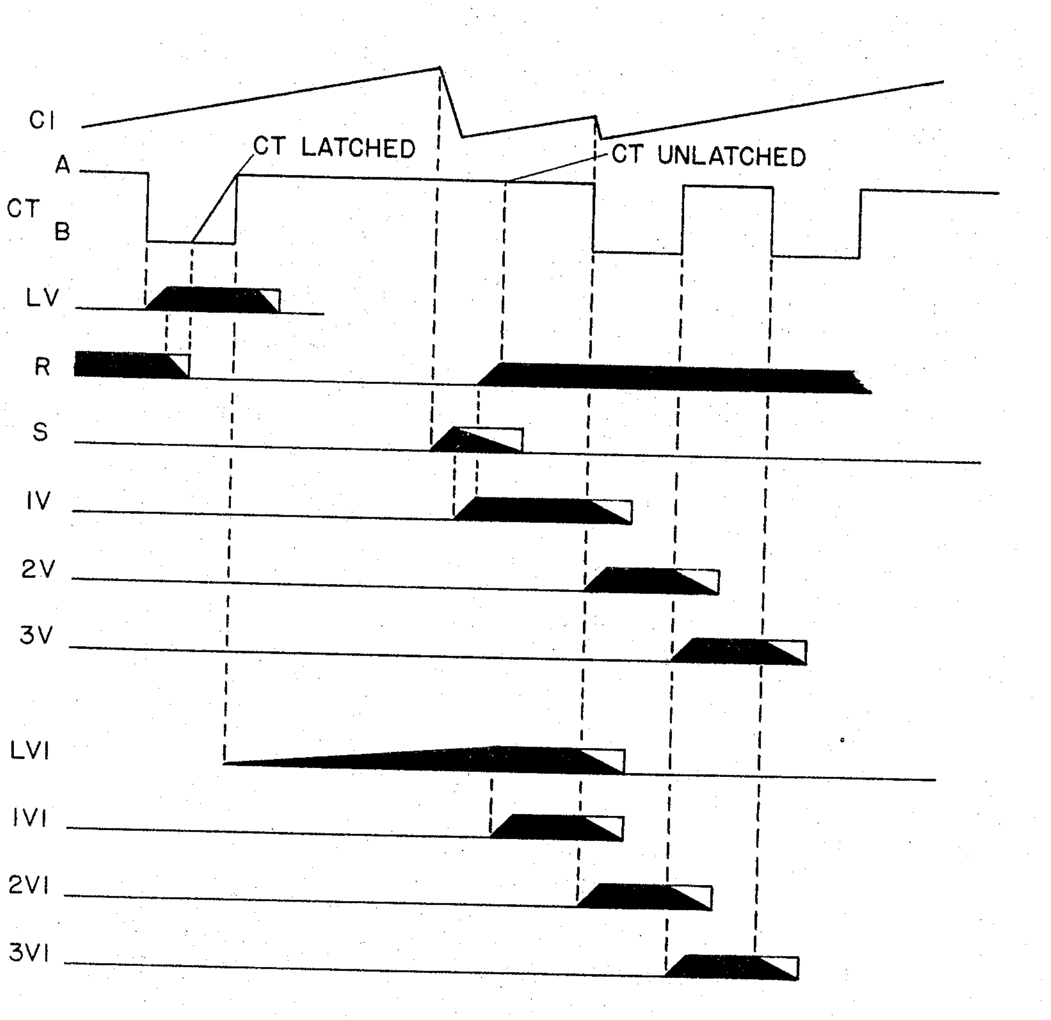

In describing the invention in detail, reference is made to the accompanying drawings wherein:

FIG. 1 is a block diagram of a communication system organized according to one embodiment of the present invention;

FIGS. 2A and 2B when placed side by side illustrate a circuit organization for one embodiment of the present invention organized according to the block diagram of FIG. 1;

FIG. 3 is a sequence chart illustrating the sequence of operation of relays that may be obtained for the embodiment of the invention illustrated in FIGS. 2A and 2B; and, FIG. 4 is a circuit organization for a typical field transmitter.

With reference to FIG. 1, the system comprises a Clock 10 for applying pulses of alternate polarity to a communication channel 11 extending from a central office to a plurality of remote stations at which binary devices are located, the conditions of which are to be indicated at the central office. The Clock 10 transmits repeatedly cycles of successive pulses, one pulse for each step of an associated Stepper 12, which Stepper 12 is effective to stop the Clock 10 after a series of steps has been taken. A Timer 13 is provided at the central office for starting the Clock 10 after having timed a rest period between cycles.

Each of the stations is driven by the central office over the communication channel 11 and it has a Stepper 14 which is powered solely from the communication channel 11 and is actuated substantially in synchronism with the stepper at the central office. Each of the stations has a Timer 15 for effectively recognizing a substantially long period of energization of the communication channel between cycles and for resetting the associated Stepper 14 to condition the system for the next cycle of operation.

The Timers 15 are also powered solely by drive pulses that are received over the communication channel 11.

The Stepper 14 at each station controls an Encoder 16 which selects codes for transmission to the central office in accordance with positions of a plurality of binary devices at the associated station. Each Encoder 16 selectively provides an output during each step in accordance with the condition of the binary device associated with that step. Transmitters F1 and F2 for the Stations 1 and 2 respectively are powered solely by the output of the associated Encoders 16, which energy in turn is derived solely from the drive pulses received over the communication channel 11. The outputs of the respective station transmitters are applied at frequencies F1 and F2 respectively to the communication channel 11 substantially simultaneously. The Transmitters F1 and F2 can be of the conventional carrier current transmitting type wherein a distinctive carrier frequency is transmitted from each station. It is to be understood that other types of transmitters may be used, particularly for single station systems, wherein it is unnecessary to transmit from a plurality of stations at the same time. Such a transmitter, for example, could be a transmitter that would selectively apply a shunt across the communication channel to increase the current in the communication channel and thereby register a code character at the central office.

Receivers F1 and F2 are provided at the central office for receiving the codes transmitted over the communication channel 11 and the outputs of these receivers are applied simultaneously to an Indication Registration and Storage 17 to register the indications of the conditions of the binary devices at the respective stations.

It is to be understood that the Clock 10 of FIG. 1 can take a number of different forms well known in the art, but for the purpose of simplicity in this embodiment of the present invention, such Clock 10 has been illustrated as being provided in the form of an electromechanical oscillator CT (see FIG. 2A). This oscillator is operable to alternately close A and B groups of contacts at a rate determined mechanically by a torsional spring (not shown) which drives a pendulum and cam organization to actuate the contacts. Each time the oscillating mechanism rotates through a center position, one of the sets of contacts is closed, and that set is maintained closed until the rotation of the pendulum through center in the opposite direction, at which time the other set of contacts is closed. This oscillating operation of the mechanism takes place when the oscillator CT is deenergized, and cessation of operation of the oscillator CT is rendered effective by the energization of the winding whereby the oscillator becomes inactive with its A group of contacts in their closed positions.

The central office stepper is illustrated in FIG. 2A as being of the relay type wherein the relays 1V–LV form the respective steps. These relays are operated succesively in a manner comparable to the operation of a ring counter, and they are preferably of the reed relay type. A similar stepper is illustrated in FIG. 2B for a typical station.

The Timer 13 of FIG. 1 for determining the rate of cycle transmission from the central office is illustrated in FIG. 2A as comprising a capacitor C1 which has its rate of charge determined by a resistor 18. The timer also includes a start relay S and an unijunction transistor 19 that is used for controlling the start relay S. A relay R, and an associated relay RP are provided for controlling the operation of the oscillator CT.

Having thus considered the general organization of the system, further detail consideration will be given as to the mode of operation under typical operating conditions.

OPERATION

A system according to the present invention does not fall readily into either the class of normally inactive code communication systems or the class of systems that are normally active because of the use of the Timer 13 at the central office. The setting of this timer can be such as to render the system effectively normally active in that the synchronizing pulse at the end of each cycle of operation can be made so short that a second cycle is initiated after a minimum clear-out time period has been provided, thus making the system substantially continuously operating. On the other hand, if it is unnecessary to scan the indications at such a rapid rate, the Timer 13 can be made to time a relatively long interval between cycles so that transmission can be rendered effective only after a substantial period of time has elapsed since the transmission of the next prior cycle. Under these conditions, it could be considered that the system would be at rest a substantial portion of the time, and thus the system might be considered as being normally inactive. This system differs from most inactive systems, however, in that no manual initiation is ever required other than the initial application of power to the system.

The system has been illustrated in the drawings as being in a state of rest between cycles of operation wherein all of the relays are in their dropped away positions except that the oscillator control relay RP (see FIG. 2A) at the central office is normally energized in an obvious manner through a suitable limiting resistor 20. In accordance with the energization of this relay, the oscillator CT is latched with its group A contacts closed.

During a period of rest, the capacitor C1 at the central office has energy applied thereto in a charging circuit including the resistor 18, and thus a charge is building up in this capacitor at a rate selected in accordance with the desired frequency of cycles of transmission. When the capacitor C1 becomes sufficiently charged to render the unijunction transistor 19 to be forward-biased, the relay S picks up as is illustrated in the sequence chart of FIG. 3. The picking up of relay S causes the picking up of relay R by the closure of a circuit including resistor 21, winding of relay R, diode 22 and front contact 23 of relay S. After relay R has become picked up, a stick circuit is established for that relay through its front contact 24 to shunt the contact 23 out of the circuit just described. This provides that relay R is maintained picked up throughout the cycle of operation. The capacitor C1 becomes discharged between timing periods through diode 80, resistor 81, front contact 39 of relay 1V, contact 36 of oscillator CT and front contact 24 of relay R. The picking up of relay R causes the dropping away of its associated repeater relay RP by a shunt applied across the winding of relay RP through diode 25 and front contact 26 of relay R. Because of this shunt, the relay RP becomes dropped away and unlatches the oscillator CT by removing energy from the winding of that oscillator upon the opening of front contact 27 of relay RP. The oscillator CT is illustrated as applying positive potential through contact 28 to wire L1 of the communication channel when the system is at rest, and at the same time negative potential is applied through the contact 29 of oscillator CT to the wire L2 of the communication channel.

Subsequent to the deenergization of the oscillator CT, some time is consumed in operating the oscillator to its center position as is illustrated by the sequence chart of FIG. 3, and during this time the first step relay 1V becomes picked up. This relay is picked up in response to the picking up of relay S, and its is energized by a circuit including the winding of relay 1V and front contact 23 of relay S. Relay S is only momentarily picked up because its energization is dependent upon the charge on the capacitor C1, thus the relay 1V is maintained energized by a stick circuit. This stick circuit includes the winding relay 1V, front contact 30 of relay 1V, diode 31, contact 32 of oscillator CT and front contact 24 of relay R.

The oscillator CT, after becoming unlatched, is effective to pole change the communication channel 11 at a constant rate, the reverse polarity being applied to the line wires L1 and L2 through the filter 33 and contacts 34 and 35 which are closed in the B position of the oscillator CT.

At the time when the communication channel 11 is changed to reverse polarity, the closure of the contact 36 of oscillator CT in its B position applies energy to the bus OE (odd to even transfer), and the opening of contact 32 of the oscillator CT removes energy from the bus EO (even to odd transfer). These are the pick up buses for the respective even and odd numbered stepping relays 1V–LV. At the time this transfer takes place for the first time in the cycle, the relay 1V is already in its picked up position as has been described, and capacitor C2 has been charged through diodes 37 and 31 and contact 32 of the oscillator CT. Upon the opening of the contact 32 of the oscillator CT, the capacitor C2 maintains energy on a stick bus OS for a period of time to maintain the odd numbered stepping relay last picked up in its picked up position for sufficient time to insure the picking up of the next stepping relay. In other words, the capacitor 32 provides energization to cover up any transition time that may occur between the opening of contact 32 of the oscillator CT and the closing of the contact 36. As to whether this holding circuit is required or not, is dependent upon the transition time involved and is also dependent upon the relative pick up and drop away times of the reed relays that are employed as stepping relays.

The relay 2V becomes picked up in accordance with the closure of the contact 36 of the oscillator CT by the energization of a circuit including the winding of relay 2V, front contact 39 of relay 1V, contact 36 of oscillator CT, and front contact 24 of relay R. This relay is maintained energized until after the beginning of the next odd pulse by energy applied to the even stick bus ES by a capacitor C3 in a manner similar to that which has been specifically described wherein the capacitor C2 provides for energization of the odd stick bus OS. Relay 1V becomes dropped away shortly after the relay 2V has had time to become picked up because of the discharge of the capacitor C2 through its winding. This relative timing is illustrated in the sequence chart of FIG. 3.

At the beginning of the next odd pulse of the cycle, the relay 3V becomes picked up by the energization of a circuit including the winding of that relay, front contact 40 of relay 2V, contact 32 of oscillator CT and front contact 24 of relay R. This relay is maintained energized until relay 4V has time to become picked up during the next even pulse in the same manner as has been described in detail relative to the control of relay 1V.

During the transmission of the last even pulse of a series of pulses constituting a cycle of operation of the communication system, the last step relay LV is picked up at the central office. The number of steps that are included at the central office and thus the number of pulses transmitted in a series constituting a cycle, is dependent upon the maximum number of indications to be transmitted from any one of the transmitting stations. Only six stepping relays have been illustrated in this embodiment of the present invention, but it is to be understood that more or less stepping relays can be employed in accordance with the requirements of practice. This is particularly indicated by the dotted lines included in the control buses between the relay 5V and the last step relay LV.

For the embodiment illustrated, assuming that there are only six steps, the relay LV is picked up during the last pulse of the cycle by the energization of a circuit including the winding of that relay, front contact 41 of relay 5V, contact 36 of oscillator CT and front contact 24 of relay R. Relay LV is maintained picked up by a stick circuit including stick bus ES and front contact 42 of relay LV. At the beginning of the following pulse, the relay R becomes dropped away because of a shunt applied across its winding including front contact 43 of relay LV, bus EO and contact 32 of oscillator CT. Thus the relay R becomes dropped away, and the dropping away of this relay causes the picking up of relay RP by removing the shunt that has been applied to that relay in accordance with the opening of front contact 26 of relay R. The picking up of relay RP closes its front contact 27 to energize the oscillator CT, and thus effectively latches the oscillator CT in its A position. This completes the cycle of operation for the transmission of drive pulses over the communication channel from the central office, and another cycle of operation will be initiated when the charge on the capacitor C1 becomes sufficient to provide a forward bias for the unijunction transistor 19 as has been described to cause the picking up of the start relay S.

TRANSMISSION FROM A TYPICAL STATION

The apparatus at the stations is illustrated in FIG. 2B as being in a condition of rest corresponding to the condition described for the apparatus at the central office wherein the stepping relays 1V1–LV1 are all in their deenergized positions. The drive pulses applied to the communication channel 11 at the central office are received at each station through a suitable filter 44, the output of which is applied across a divider network of diodes 45 which are arranged in a manner to provide for the selective energization of buses OE1 and EO1 in accordance with the polarity of energization of the communication channel wires L1 and L2. If wire L2 is of negative polarity, the bus EO1 is energized, and if the wire L1 is of negative polarity, the bus OE1 is energized. These buses will be recognized as corresponding to the buses EO and OE at the central office for the control of the picking up of the step counting relays.

During the period of rest between cycles, the capacitor C4 is being charged at a rate determined by the resistor 46. The capacitor C4 is connected across the winding of the relay LV1, and thus the relay LV1 is effectively made a slow pick up relay by the capacitor C4 so that it becomes picked up only after the charge on the capacitor C4 has been built up to a particular potential. The circuit by which the capacitor C4 is charged at this time extends from the line wire L1 including a winding 47 of the filter 44, diode 48, resistor 46, capacitor C4, bus OS1, diode 49, diode 50, limiting resistor 60 and winding 61 of the filter 44 to the wire L2 of the communication channel 11. The time constant of the circuit for charging the capacitor C4 is such that the relay LV1 becomes picked up well before the termination of the rest period by the pole changing of the communication channel 11 at the control office. To insure that capacitor C4 becomes completely discharged between its timing operations, it is discharged when relay 3V1 picks up through diode 82, resistor 83 and front contact 84 of relay 3V1.

Upon the picking up of relay LV1, the relay 1V1 becomes picked up by the energization of a circuit including line wire L1, winding 47 of the filter 44, diode 48, winding of relay 1V1, diode 62, front contact 63 of relay LV1, bus EO1, diode 50, limiting resistor 60 and winding 61 of the filter 44. The picking up of relay 1V1 establishes a stick circuit for that winding including winding 47 of filter 44, diode 48, winding of relay 1V1, front contact 64 of relay 1V1, diode 49, diode 50, resistor 60 and winding 61 of the filter 44. Capacitors C5 and C6 are charged during respective odd and even drive pulses from the line circuit for the purpose of providing stick energy for the stepping relays to cover the transition time in the change in polarity of the line circuit in a manner which has been described when describing in detail the operation of the stepper at the central office. The stepping relay 1V1 is thus picked up sufficiently before the termination of the period of rest to transmit the first indication before the line circuit is pole changed for the first time during a cycle. This sequence of operations is illustrated in FIG. 3 wherein it is shown that the relay 1V1 becomes picked up well before the end of the period of energization of the line circuit during the period of rest in accordance with the shifting of the contacts of the pole changing oscillator CT.

In response to the pole changing of the line circuit for the first time during a cycle of operation, the relay 2V1 becomes picked up by the energization of a circuit extending from the line wire L2 including winding 61 of the filter 44, resistor 60, diode 65, winding of relay 2V1, front contact 66 of relay 1V1, diode 67, and winding 47 of filter 44 to line wire L1.

The relay 3V1 becomes picked up when the line circuit is next pole changed by energy over the communication channel 11 wherein the relay 3V1 becomes energized in a circuit extending from line wire L1 including winding 47 of filter 44, diode 48, winding of relay 3V1, front contact 68 of relay 2V1, diode 50, resistor 60 and winding 61 of filter 44 to the communication channel wire L2. Thus, the stepping progresses at each station by a mode of operation comparable to that which has been described in detail relative to the mode of operation of the stepper at the central office. The field station stepper differs from the stepper at the central office particularly in that only a number of steps is required at each station corresponding to the number of binary devices to have their indications transmitted from that station. In other words, if there are only four devices to have their positions indicated at Station No. 1, only four stepper relays are required, even though some other station may have a greater number of indications to be transmitted, and thus require a greater number of steps to be taken. In any case, as has been heretofore pointed out, the stepper at the central office should include as many steps as the greatest number of indications to be transmitted at any one station.

Four binary devices 1TR–4TR are illustrated as being provided at Station No. 1 to have their positions indicated at the central office during respective steps 1–4. These devices can be considered as track relays which are normally picked up to register the unoccupied condition of respective railway track sections, such relays being dropped away whenever their associated track sections are occupied by a train. It will be readily apparent, however, that other types of devices can be used to have their conditions indicated at the central office in accordance with the requirements of practice.

Upon the picking up of the first stepper relay 1V1 at Station No. 1, the Transmitter F1 is powered over the communication channel 11 to transmit over the communication channel a pulse of frequency F1 if the track relay 1TR is in its picked up position. If this relay is dropped away because of its associated track section being occupied by a train, no energy is transmitted by the Transmitter F1 during the first period of the cycle. If the track relay 1TR is in its picked up position at the time when the relay 1V1 becomes picked up in a cycle of operation, a pulse is generated by the Transmitter F1 in accordance with the energization of that transmitter from the communication channel in a circuit extending from line wire L1 including winding 47 of filter 44, diode 48, wire 48*a*, Transmitter F1, wire 69*a*, front contact 69 of relay 1TR, front contact 64 of relay 1V1, diode 49, diode 50, resistor 60 and winding 61 of the filter 44, to line wire L2. The Transmitter F1 is powered solely by this circuit (see FIG. 4), and thus by energy received over the communication channel 11 from the central office, to provide an output pulse at frequency F1 over wires 70 and 71 to the communication channel 11. If the relay 1TR is dropped away rather than being picked up as has been heretofore described, there obviously is no energy applied to the communication channel 11 by the wires 70 and 71 during the first step of the cycle. In a similar manner, the Transmitter F1 is selectively rendered operable to provide an output to the communication channel in accordance with the condition of the binary device associated with each step as the stepping through a cycle of operation progresses.

A circuit for a typical field station transmitter to be energized solely by the energy of line circuit pulses is shown in FIG. 4 wherein power is selectively applied to the input wires 48*a* and 69*a* from the line wires L1 and L2 as a sole source of power to operate the transmitter. Reference can be made to the above mentioned Patent No. 3,021,506 for a more complete description of this transmitter.

*Reception at the central station*

As has been heretofore pointed out when considering the general mode of operation of the system, all stations transmit simultaneously on different frequencies, and thus the Receivers F1 and F2 (see FIG. 2A) for Stations 1 and 2 respectively, for example, both are controlled simultaneously on the different steps of a cycle in accordance with the conditions of devices at the associated locations. An output relay R1 of the receiver F1 is picked up if carrier is received during the first step of a cycle in accordance with transmission from Station No. 1, and similarly, relay R2 is picked up if there is a pulse received by Receiver F2 from Station No. 2 during the same step. This same procedure is repeated for each step of a cycle.

Indication registration devices 1K and 2K, which are assumed to be provided for registration of the indications received during the first and second steps from Station No. 1, are illustrated as typical of similar devices that can be provided for registration of the indications received from each of the other stations, and also typical of the devices than can be provided for indications received on other steps of the cycle. For the form of indication registration illustrated, the indication registration devices 1K and 2K can be assumed to be neutral relays, that are respectively picked up or released in accordance with whether the carrier energy is received during the associated steps from the associated station, or whether no pulse is transmitted from the associated station during such interval.

If it is assumed that a pulse of carrier at frequency F1 is received at the central office over the communication channel 11 during the first step of the cycle, the relay 1K becomes picked up in accordance with the energization of the relay R1 during that step. The circuit by which the relay 1K becomes picked up at this time includes front contact 72 of relay R1, diode 73 and photo-resistor 74. The photo-resistor 74 is rendered conductive during the step because of the energization of its associated lamp E1 in the circuit including front contact 72 of relay R1, diode 73, lamp E1, front contact 30 of relay 1V, diode 31, contact 32 of oscillator CT and front contact 24 of relay R. The indication registration relay 1K is maintained picked up by a stick circuit including resistor 75 and front contact 76 of relay 1K.

If it is assumed that the track section (not shown) associated with the control of the relay 1TR at Station No. 1 now becomes occupied, during the first step of the next cycle of operation, there is no carrier frequency F1 transmitted during that step, and in accordance with this indication, the relay 1K becomes dropped away because of a shunt applied to its stick circuit during the first step. This shunt is applied through resistor 75, diode 77, lamp E1, front contact 30 of relay 1V, diode 31, contact 32 of oscillator CT and front contact 24 of relay R. This relay 1K can be used, for example, to control a visual indicator, such as an indicator lamp on a control panel, in accordance with the requirements of practice.

Having thus described a system for registration of an indication received during the first step as typical, it should be understood that similar indication registration means can be provided for each of the other steps. It is also to be understood that similar indication registration means is provided for registering indications from each of the other stations that may be included in the system during the respective steps, the registration means for the first step for Station 2, for example, is connected in multiple with the registration means that has been described. The indication registration means for the first step for receiving indications from Station No. 2 is controlled in accordance with the closure of front contact 78 of relay R2 in a manner similar to the manner which has been described wherein a registration relay is controlled in accordance with the closure of front contact 72 of relay R1. The lamp for controlling the photo-resistor for the registration device associated with Station No. 2 would be connected to the wire 79 in multiple with the lamp E1.

Having thus described a communication system as one embodiment of the present invention, it is to be understood that various adaptations, and modifications may be applied to the specific form shown in accordance with the requirements of practice except as limited by the scope of the appending claims.

What is claimed is:

1. A system for the communication of indications of conditions of a plurality of binary devices over a communication channel from at least one remote field station to a control office comprising, transmitting means at the control office for applying pulses of energy of alternately different character to the communication channel, receiving means at each of the field stations for receiving the pulses, transmitting means at each of the field stations operable when rendered effective to transmit over said communication channel indications of the conditions of said binary devices at the associated stations, and stepping means at each of the field stations powered solely by the energy of said pulses received over the communication channel by said receiving means from the control office for sequentially rendering effective the transmission by said field station transmitting means over said communication channel of indications as to the conditions of the respective binary devices at that station, the conditions of different binary devices being transmitted during respective steps of the stepping means.

2. The invention according to claim 1 wherein said transmitting means is also powered solely by the energy of said pulses received over the communication channel by said receiving means.

3. The invention according to claim 1 wherein the pulses applied by the control office transmitting means are direct current of alternating polarity.

4. A system for the communication of indications of conditions of a plurality of binary devices over a communication channel from each of a plurality of remote field stations to a control office comprising, transmitting means at the control office including means for selectively transmitting pulses of energy of alternately different character over the communication channel, receiving means at each of the field stations for receiving the pulses, transmitting means at the several field stations operable when rendered effective to transmit over said channel pulses of energization of respectively different frequencies, said pulses being selected for transmission in accordance with the conditions of said binary devices at the associated stations, stepping means at each of the field stations powered solely by the energy of the pulses received over the communication channel from the control office by said receiving means for sequentially rendering effective the transmission during respective steps of the stepping means of energy of the particular frequency associated with that station selectively in accordance with the conditions of the several devices at that station during the respective steps, and receiving means at the control office for registering simultaneously indications received on the several frequencies from the several field stations during each step.

5. A system according to claim 4 wherein said control office receiving means has a single stepping means operated by said control office transmitting means for sequentially registering indications received from all stations during the respective steps.

6. In a system for the communication of indications of a plurality of indication devices over a communication channel connecting a control office with at least one remote field station, transmitting means at the control office for applying a series of direct current pulses of alternate polarity to the communication channel, receiving means at each field station coupled to the communication channel for receiving the pulses transmitted from the control office, said receiving means having unidirectional devices for alternately energizing odd and even buses with energy received over the commuication channel, the odd bus being energized during the reception of odd pulses and the even bus being energized during the reception of even pulses, stepping means at each field station powered solely by the energy of the pulses received over the communication channel by said receiving means and applied to the odd and even buses for sequentially rendering the transmission of indications of the conditions of said indication devices effective, said stepping means having a binary device for each pulse of the series of pulses and means for actuating the binary devices sequentially, one for each pulse received, the binary device for each of the odd pulses being energized from said odd bus if the binary device for the preceding pulse has been actuated, and the binary device for each of the even pulses being energized from said even bus if the binary device for the preceding pulse has been actuated, and holding means for maintaining said binary devices actuated for a short period of time after the termination of the pulse with which that binary device is associated.

7. The invention according to claim 6 wherein said binary devices are relays.

8. The invention according to claim 7 wherein said holding means comprises odd and even capacitors charged respectively from said odd and even buses, one of said capacitors being discharged upon termination of each pulse through a front contact of the winding of a corresponding odd or even relay that has been picked up during that pulse.

9. A system for the communication of indications of conditions of a plurality of binary devices over a communication channel from each of a plurality of remote field stations to a control office comprising, transmitting means at the control office for repeatedly transmitting a series of pulses which are alternate in character, the series of pulses being separated by a distinctive synchronizing pulse, receiving means at the several receiving stations for receiving the pulses, transmitting means at the several field stations operable when rendered effective to transmit over said communication channel pulses of energization of respectively different frequencies for the several field stations, stepping means at each of the field stations powered solely by energy of the pulses received over the communication channel by said receiving means for sequentially rendering effective the transmission during respective steps of the stepping means of energy of the particular frequency associated with that station selectively in accordance with the conditions of the several devices at that station during the respective steps, said stepping means being conditioned in response to said synchronizing pulse for rendering the reception of the next pulse effective to initiate another cycle of operation over said stepping means, and receiving means at the control office for registering simultaneously indications received on the several frequencies from the several field stations during each step.

10. The invention according to claim 9 wherein said synchronizing pulse is of an abnormally long duration and said stepping means at each of the field stations has a synchronizing pulse responsive device which is effective when actuated to permit the initiation of another cycle of operation of the stepper upon the reception of the first pulse of a new series of pulses.

11. A system for the communication of indications of conditions of a plurality of binary devices over a communication channel from each of a plurality of remotely spaced field stations to a control office comprising, transmitting means at the control office for repeatedly applying a series of pulses to the communication channel of alternate polarity, the series of pulses being separated by a pulse of abnormally long duration, receiving means at the several field stations for receiving the pulses transmitted from the control office, said receiving means including means for feeding the energy from the communication channel through a filter and unidirectional devices to odd and even buses selectively in accordance with the polarity of the pulses received, a bank of stepping relays at each of the field stations, one stepping relay being provided for each of the pulses of said series, means for energizing the relays for odd pulses from said odd bus provided the relay for the preceding pulse is energized, and means for energizing the relays for even pulses from said even bus provided the relay for the preceding pulse is energized, the relay for the first pulse of each series being energized in accordance with the energization of the last of the stepping relays by said pulse of abnormally long duration, holding means including a capacitor for the odd steps and a capacitor for the even steps for maintaining each of the stepping relays energized for a short period of time following the termination of the pulse during which that stepping relay has been picked up, transmitting means at the several field stations powered solely by energy pulses received by said receiving means over the communication channel for selectively transmitting or not transmitting energy in accordance with the condition of a binary device at that station in turn as the several devices are selected in accordance with the condition of said stepping means, receiving means at the control office for simultaneously receiving all frequencies transmitted by the several field stations over the communication channel, indication registration means at the control office operable when rendered responsive for registering respective indication communication over the communication channel relative to the respective binary devices, and stepping means at the control office controlled by said control office transmitting means for rendering said indication registration means responsive step-by-step to indication pulses received by said control office receiving means.

References Cited

UNITED STATES PATENTS

| | | | |
|---|---|---|---|
| 2,965,882 | 12/1960 | Jackell | 340—163 |
| 3,035,248 | 5/1962 | Grose et al. | 340—163 |
| 3,099,816 | 7/1963 | Miller | 340—163 |
| 3,122,723 | 2/1964 | Coley et al. | 340—152 X |

JOHN W. CALDWELL, *Primary Examiner.*

NEIL C. READ, *Examiner.*

H. PITTS, *Assistant Examiner.*